United States Patent [19]
Ono

[11] Patent Number: 5,056,008
[45] Date of Patent: Oct. 8, 1991

[54] DATA PROCESSOR HAVING EXPANDED OPERATING FUNCTIONS

[75] Inventor: Kazuhiko Ono, Tokyo, Japan

[73] Assignee: NEC Corporation, Tokyo, Japan

[21] Appl. No.: 241,442

[22] Filed: Sep. 7, 1988

[30] Foreign Application Priority Data

Sep. 7, 1987 [JP] Japan .............................. 62-224655

[51] Int. Cl.⁵ ...................... G06F 9/22; G06F 9/30
[52] U.S. Cl. ............................ 364/200; 364/262.8; 364/263
[58] Field of Search ... 364/200 MS File, 900 MS File

[56] References Cited

U.S. PATENT DOCUMENTS

| 4,101,967 | 7/1978 | Hajduk | 364/900 |
| 4,197,578 | 4/1980 | Wada et al. | 364/200 |
| 4,251,859 | 2/1981 | Momose et al. | 364/200 |
| 4,254,461 | 3/1981 | Chemia et al. | 364/200 |
| 4,293,907 | 10/1981 | Huang et al. | 364/200 |

OTHER PUBLICATIONS

J. Dirac, "Call Instruction", IBM Technical Disclosure, vol. 8, No. 12, May 1966, p. 1751.

Primary Examiner—David Y. Eng
Attorney, Agent, or Firm—Foley & Lardner

[57] ABSTRACT

A data processor includes a program memory storing a string of instructions, a program counter producing address data for designating a memory location of the program memory storing an instruction to be executed, an instruction decoder decoding the instruction read-out from the program memory and producing a set of control signals, and an execution unit for executing the read-out instruction in response to the set of control signals. The processor further includes a control signal generation circuit generating an additional control signal when the address data from the program counter takes a specific content. The address data taking the specific content is supplied to the program memory for reading out an instruction therefrom, the read-out instruction being supplied to the instruction decoder. Thus, the processor executes an operation responsive to the additional control signal in parallel with the read-out instruction accessed by the address data taking the specific content.

8 Claims, 3 Drawing Sheets

DATA PROCESSOR HAVING EXPANDED OPERATING FUNCTIONS

BACKGROUND OF THE INVENTION

The present invention relates to a data processor and, more particularly, to a processor in which a program memory for storing a string of instructions and an execution unit for decoding and executing each instruction are provided in a single semiconductor chip.

In a data processor fabricated on a single semiconductor chip such as a single-chip microcomputer or a single-chip peripheral controller for a disk drive, a display unit, etc., the operable functions thereof are determined by instructions stored in a program memory provided in the processor. That is, the processing capability is restricted by the number of and the bit length of instructions which are stored in the program memory, or by the capacity of the program memory. If the number of instructions and/or the bit length of each instruction is increased for expanding the processing capability, a structural design change is required wherein the memory capacity of the program memory and the bit length of a program counter must be enlarged. For this reason, even when a version-up processor is developed in which new operating functions are added to the previously developed processor or in which a part of the functions of the previously developed processor is improved, a new design of such a version-up processor requires a long time of duration. Moreover, the addition of new instructions increases the number of reading-out and decoding operations, so the processing speed is lowered.

SUMMARY OF THE INVENTION

Therefore, an object of the present invention is to provide a data processor equipped with an improvement for expanding the enhancing the processing functions without changing the number of instructions and the code or bit length of each instruction.

Another object of the present invention is to provide a data processor to which new processing functions can be added without lowering the processing speed.

A data processor according to the present invention comprises a program memory storing a string of instructions, an address circuit producing and supplying address data to the program memory to designate a memory location of the program memory, a decoder for decoding the instruction read-out from the program memory to produce a first control signal, a detector for generating a detection signal by detecting that the address circuit produces predetermined address data, a control signal generator responsive to the detection signal for producing a second control signal independently of the first control signal, and an execution unit responsive to the first and second control signals for executing a first operation based upon the first control signal and a second operation based upon the second control signal.

The processor of the present invention provides a control signal generator for producing the second control signal for additional processing functions or improvement in the processing functions, this generator operating independently of the instruction decoder but being responsive only to the specific address data supplied to the program memory. Accordingly, the processing functions can be expanded without changing the memory capacity of the program memory and the bit length and code of each instruction. Moreover, as the execution unit simultaneously executes the first and second operations, the processing speed is not lowered.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
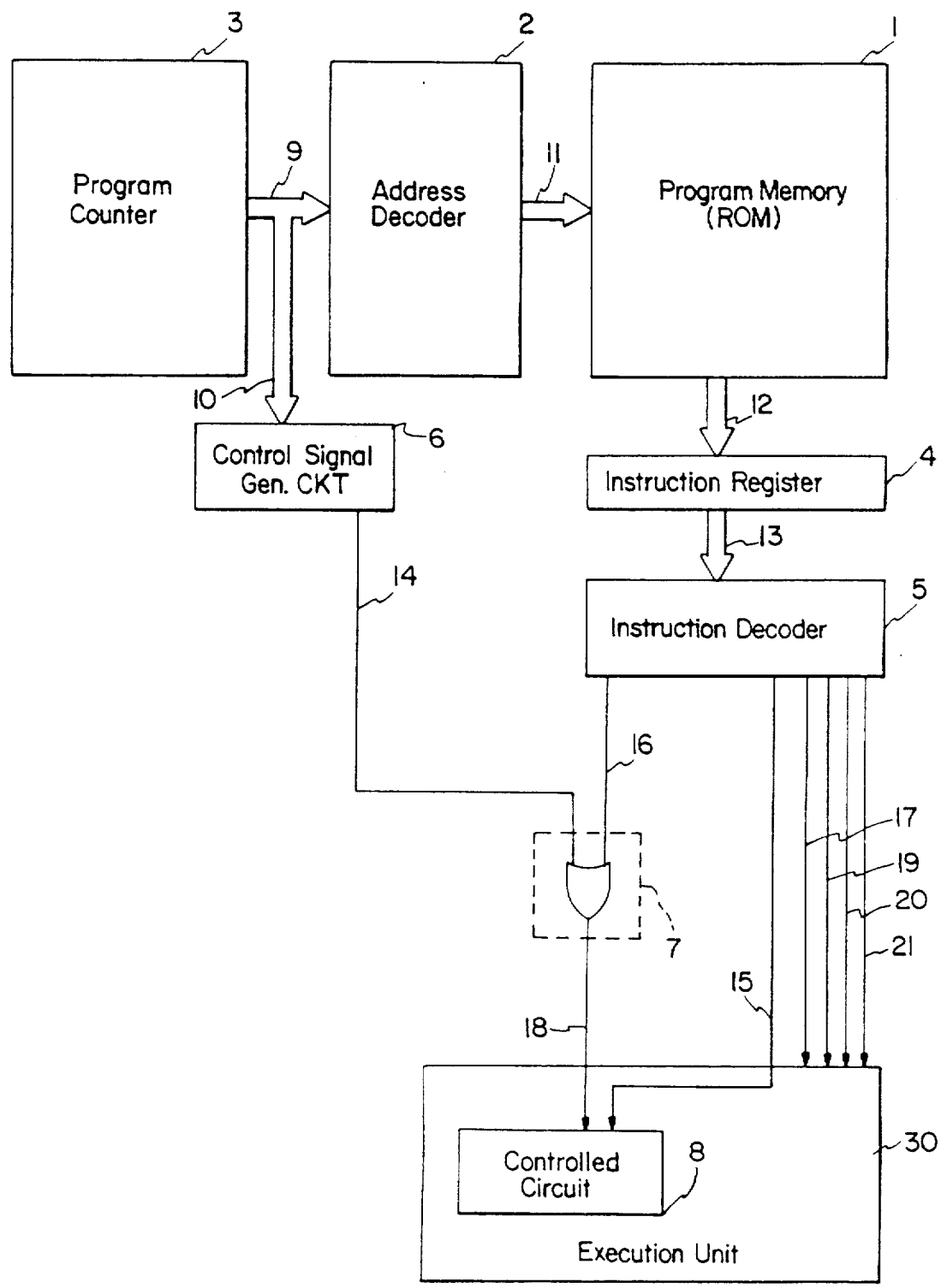
FIG. 1 is a block diagram illustrating a preferred embodiment of the present invention.

Referring now to FIG. 1, a data processor according to a preferred embodiment of the present invention is formed as a semiconductor integrated circuit and includes a program memory 1 which is a read-only memory (ROM), for example, storing a string of instructions for a program. A program counter 3 produces address data for designating a memory location of instructions stored in the program memory 1 to be executed. The address data read-out from the program counter 1 is supplied via a signal line 9 to an address decoder 2 which in turn produces a decoded address signal supplied to the program memory 1 via a signal line 11. Thus, one memory location of the program memory is designated to read-out an instruction code stored in the program memory 1. The designated location is transferred to an instruction register 4 via a signal line 12. The instruction register 4 temporarily stores the instruction code read-out from the memory 1 and supplies it to an instruction decoder 5 which produces a set of first control signals 15 to 21 in accordance with it. Selective ones of these first control signals 15 to 21 take an active level. The first control signals 15 to 21 are supplied to an execution unit 30, so that a predetermined operation responsive to the instruction read-out from the memory 1 is performed by the unit 30. In particular, the first control signals 15 and 16 are used to control a circuit 8 included in the execution unit 30.

The data processor shown in FIG. 1 further includes a control signal generation circuit 6 in accordance with the present invention. This circuit 6 receives at least a part of address data produced by the program counter 3 via a signal line 10 to detect whether or not the received address data is coincident with pre-selected address data. When the address data from the program counter 3 is coincident with the pre-selected address data, the circuit 6 generates a second control signal 14. In the present embodiment, this second control signal 14 is used for the same purpose of the control signal 16, and, therefore, the first and second control signals 16 and 14 are supplied to an OR gate 7 of which output signal 18 is supplied to the circuit 8.

Assuming that the control signal 16 is produced in response to the instruction designated by the first address data from the program counter 3, the circuit 6 generates the second control signal 14 when the program counter 3 produces the second address data that is different from the first address data. Accordingly, the signal 18 used for controlling the circuit 8 is generated when the program counter 3 produces not only the first address data but the second address data. Moreover, the second address data from the program counter 3 designates the location in the memory 1 to derive an instruction that changes a level of the control signal 19, for example, to an active level. Consequently, the execution unit 30 performs the processing operation in response to the control signal 19, simultaneously with the control of the circuit 8 by the signal 19. Furthermore, since the second control signal 14 is generated in response to the address data from the program counter 3, an increase in the number of instructions in the program memory 1 and the code and bit length of each instruction are not required. This, the set of first control signals 15 to 21 from the instruction decoder 5 and the second control signal 14 from the circuit 6 are produced independently of each other in response to one address data from the program counter 3. These first and second control signals are processed in the same instruction execution cycle, resulting in no lowering of the execution speed. On the other hand, if the second control signal 14 is employed separately from the first control signals 15 to 21, the OR gate 17 may be omitted to supply the second control signal 14 directly to the execution unit 30.

Figure 2:
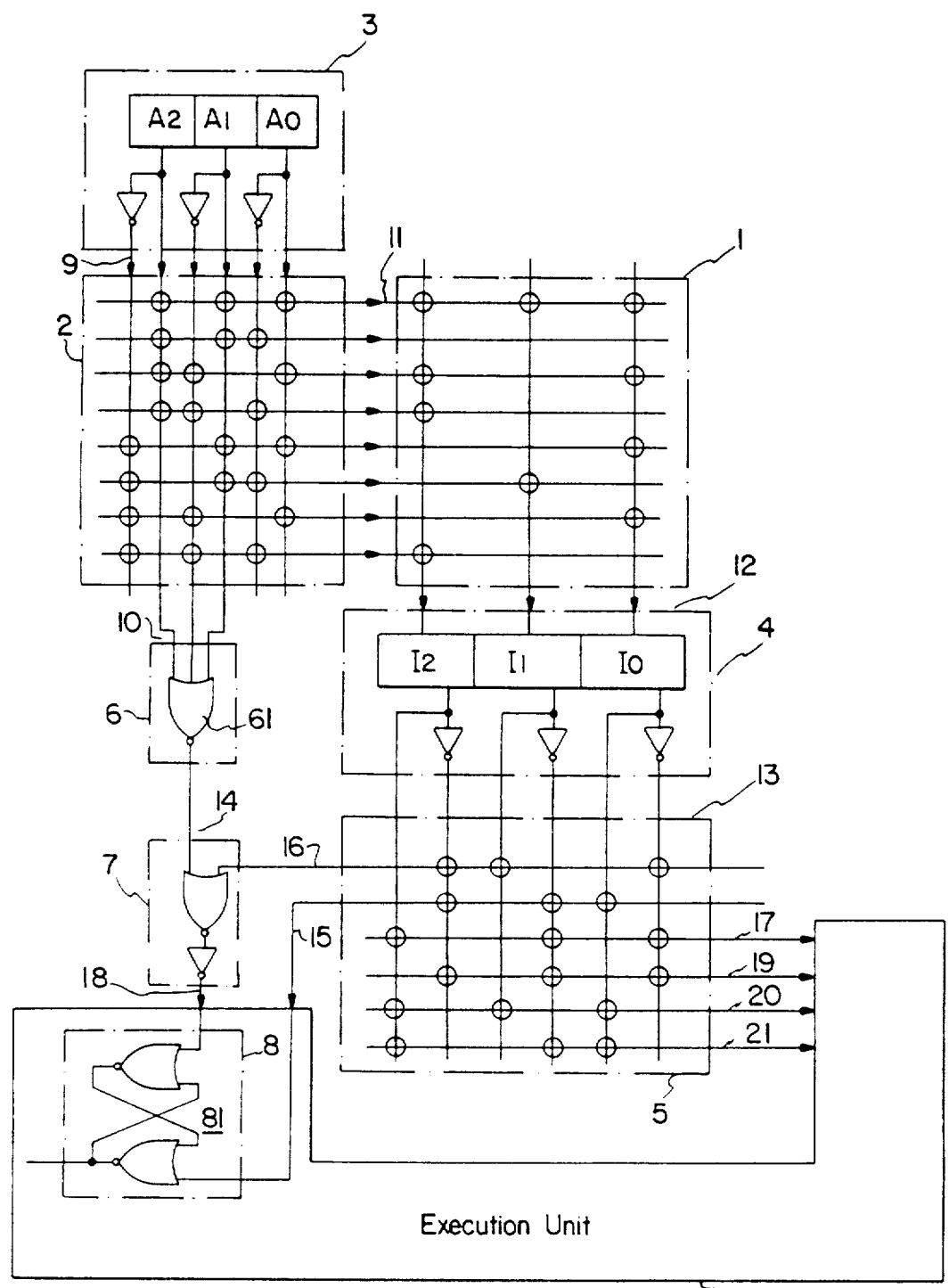
FIG. 2 is a circuit diagram representing a detailed construction of the respective blocks shown in FIG. 1.

Referring to FIG. 2, there is shown a detailed circuit construction of the respective blocks in FIG. 1 in order to further describe the features and operations of the present invention. The program counter 3 produces the address data of three bits $A_0$, $A_1$ and $A_2$. The true and complementary signals thereof are supplied to the address decoder 2. The program memory 1 stores eight kinds of instructions shown in the following table 1. Each instruction consists of three bits $I_0$, $I_1$ and $I_2$.

TABLE 1

| Address | | | Instruction Code | | | Control Signal Taking |
|---|---|---|---|---|---|---|
| $A_0$ | $A_1$ | $A_2$ | $I_0$ | $I_1$ | $I_2$ | Active Level |
| 0 | 0 | 0 | 0 | 0 | 0 | 20 |
| 1 | 0 | 0 | 1 | 1 | 1 | 19 |
| 0 | 1 | 0 | 0 | 1 | 0 | 21 |
| 1 | 1 | 0 | 1 | 1 | 0 | 17, 14 |
| 0 | 0 | 1 | 0 | 1 | 1 | 15 |
| 1 | 0 | 1 | 1 | 0 | 1 | 16 |
| 0 | 1 | 1 | 0 | 1 | 1 | 15 |
| 1 | 1 | 1 | 1 | 1 | 0 | 17 |

The control signal generation circuit 6 is composed of three-input NOR gate 61 which receives the complement level of the first address bit $A_0$, the complement bit of the second address bit $A_1$ and the true bit of the third address bit $A_2$. Therefore, the control signal generation circuit 6 generates the second signal 14 when the program counter 3 produces the address data of "110". This address data is used to read the instruction code of "110" from the program memory 1 and activates the control signal 17.

In an initial state, the program counter 3 is reset to "000", and hence the program stored in the memory 1 is executed from the memory location "0". The instruction code "000" stored in the memory location "0" is read-out from the memory 1 and then transferred to the register 4. The instruction decoder 5 decodes the instruction "000" so that the execution unit 30 performs the operation based upon the active level control signal 20. When the instruction execution is completed, the content of the program counter 3 is incremented to designate the next memory location "1" of the memory 1. When the program counter 3 now produces the address data of "110", the control signal 17 takes an active level, so that the execution unit 30 executes "CALL" instruction. Simultaneously, the second control signal 14 takes an active level to set a flip-flop 81 forming the circuit 8. As a result, the data processing is performed by use of the set output of the flip-flop 81. Subsequently, in response to the instructions stored in the memory locations "5", "6" and "7", the control signals 16, 15 and 17 are respectively activated, so that the corresponding data processings are performed by the execution unit 30. Thus, the flip-flop 81 is set by the instructions stored in the memory locations "4" and "6" of the program memory 1 and further set by the address data of "110" from the program counter 3 independently of the instruction decoder 5. The address data "110" reads out the "CALL" instruction. Namely, the set condition of the flip-flop 81 and the "CALL" instruction are executed in the same cycle.

Next, one example of the data processing will be described below. The data processor performs a serial data transfer function in which data to be transferred is read-out from a source device in a bite unit and checked to have a correct form in a bite unit. In this case, the data checking operation is carried out in response to the instruction for requesting the next bite data to the source device. In construction shown in FIG. 2, the flip-flop 81 is set by the instruction for next bite data transfer. The set output of the flip-flop 81 is thus employed for starting the data checking operation. When the last bite data is requested to be read from the source device and then transferred to a destination device, the bite data to be transferred is no longer present in the source device. That is, the flip-flop 81 is not set so that the data checking for the last bite data is carried out. However, by setting the address data of "110" into the program counter 3, the flip-flop 81 is set in parallel to the execution of the "CALL" instruction which is to be executed after the serial data transfer, so that the data checking operation for the last bite data is carried out. There is no change in the number and code of instructions, to keep the processing speed quick.

Figure 3:
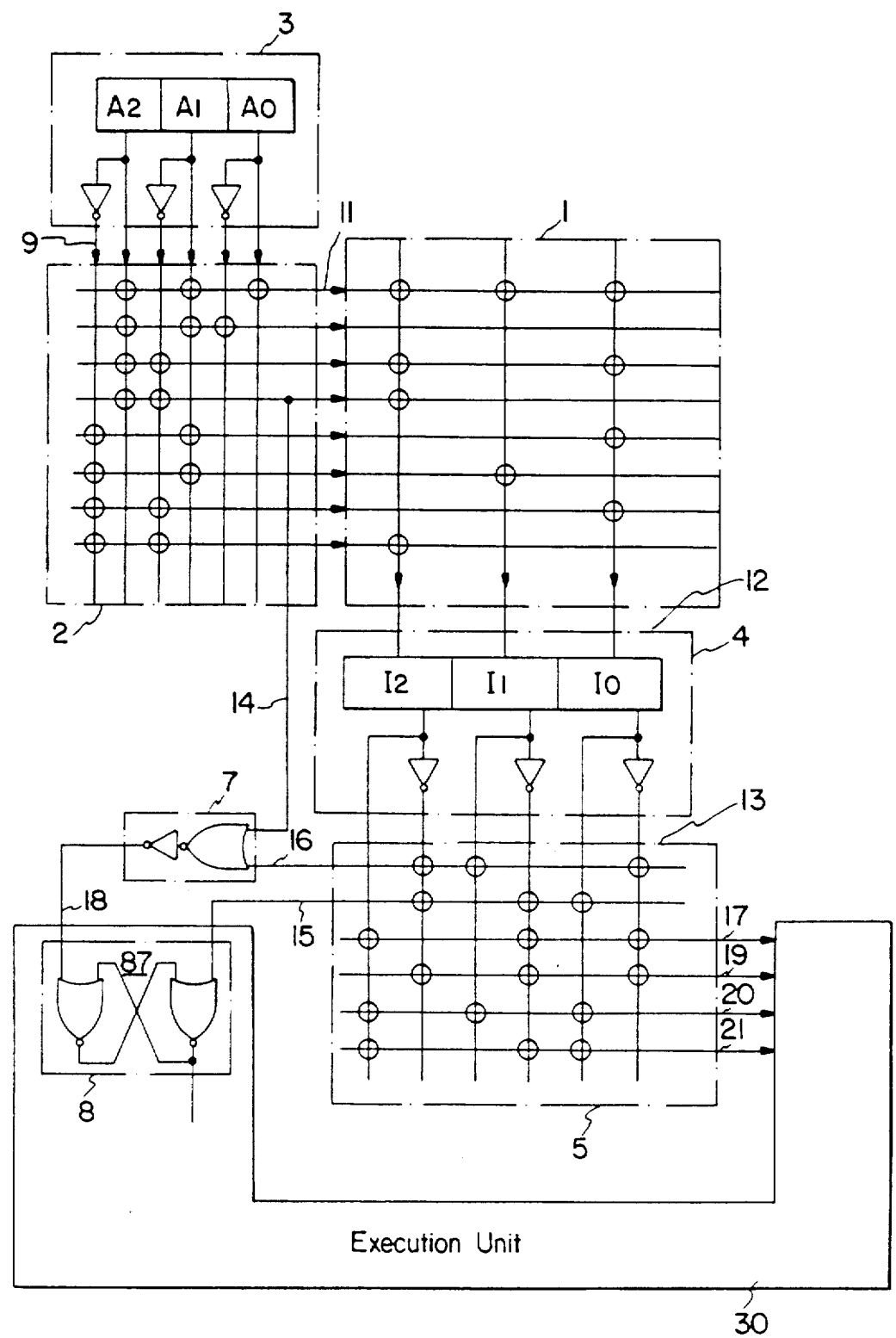
FIG. 3 is a circuit diagram illustrating another preferred embodiment of the present invention.

Referring to FIG. 3, there is shown another embodiment of the present invention wherein the same constituents as those shown in FIGS. 1 and 2 are denoted by the like reference numerals to not repeat the further description thereof. In this embodiment, the address decoder 2 is designed to have a function as the control signal generation circuit 6 shown in FIGS. 1 and 2, and therefore the circuit 6 is omitted. More specifically, the address decoder 2 receives the address data from the program counter 3. When the address data takes a value of "110", the address decoder 2 produces an active level selection signal for designating the memory location "3" of the program memory 1. This selection signal is led out as the second control signal 14 and then transferred to the OR gate 7. As a result, the "CALL" instruction is executed together with a setting of the flip-flop 81.

As described above, according to the present invention, since control signal or signals can be generated from the address data produced by the program counter, the change in the memory capacity of the program memory and in the instruction forms are not required. Moreover, two instructions are executed substantially, and hence high speed data processing is carried out. Even if the content of the program memory are read-out to reproduce the program, the reproduced program does not perform the complete processing operations by itself without the circuit configuration according to the present invention, so that protection of a program can be attained as a consequence.

The present invention is not limited to the above embodiments, but may be changed and modified without departing from the scope and spirit of the present invention. For example, two or more second control signals can be generated in response to two or more specific address data from the program counter, respectively.

What is claimed is:

1. A data processor comprising:
    a program memory for storing a string of instructions,
    an address circuit for producing and supplying address data to said program memory to designate a memory location for storing an instruction to be executed,
    decoder means for decoding an instruction read from said program memory, said decoder means producing at least one first control signal by decoding said instruction read out of said memory location of said program memory designated by first address data from said address circuit,
    means for detecting said first address data from said address circuit to generate a second control signal independently of said at least one first control signal, and
    execution means responsive to said at least one first control signal and said second control signal for executing a first operation based upon said at least one first control signal and a second operation based upon said second control signal.

2. The processor as claimed in claim 1, wherein said decoder means produces a third control signal in response to a second instruction read from said program memory by second address data different from said first address data, and said execution means includes gate means supplied with said second and third control signals and means responsive to an output of said gate means for performing said second operation.

3. The processor as claimed in claim 2, wherein said gate means is an OR gate.

4. A data processor comprising:
    a program memory for storing a plurality of instructions at respective memory locations thereof,
    a program counter producing address data, said address data having a content which is changed in a predetermined order,
    first means for detecting said content of said address data when said address data takes a predetermined content and for accessing one memory location of said program memory in response to said address data to read out an instruction from said one memory location designated by said address data to produce a first control signal,
    second means for producing a set of second control signals in response to said read out instruction,
    third means for executing an operation responsive to said first control signal, and
    fourth means for executing said read out instruction in response to said set of second control signals.

5. The data processor as claimed in claim 4, wherein said first means includes a control signal generation circuit detecting that said address data takes said predetermined content to produce said first control signal and an address decoder decoding said address data to access said program memory.

6. The data processor as claimed in claim 4, wherein said first means comprises an address decoder decoding said address data and producing a set of access signals for accessing said program memory, one of said set of access signals taking an active level when said address data takes said predetermined content, said first means further comprising means for outputting said one of said set of access signals as said first control signal.

7. The data processor as claimed in claim 4, wherein said third means is supplied with a part of said set of second control signals so that said third means executes said operation when said part of said set of second control signals takes an active level.

8. A processor comprising:
    a program counter for producing address data,
    a program memory storing a plurality of instructions for processing data,
    means responsive to said address data for reading out an instruction from said program memory,
    means for decoding said instruction read from said program memory to produce first control signals,
    means responsive to said address data having a predetermined content for producing a second control signal while said decoding means decodes said instruction read from said program memory by said predetermined content of said address data, and
    an execution unit performing a first operation responsive to said first control signals in parallel to a second operation responsive to said second control signal.

* * * * *